INVENTOR.
CLARENCE L. RANDOLPH

ATTORNEY

United States Patent Office 3,478,132
Patented Nov. 11, 1969

3,478,132
GOLF BALL COMPRISING AN ELASTOMER DISPERSION OF HIGH MOLECULAR WEIGHT POLYETHYLENE
Clarence L. Randolph, Ashland, Ohio, assignor to Eagle Rubber Co., Inc., Ashland, Ohio, a corporation of Delaware
Filed Feb. 23, 1967, Ser. No. 618,098
Int. Cl. C08d 9/10; A63b 37/00
U.S. Cl. 260—889   2 Claims

ABSTRACT OF THE DISCLOSURE

This invention relates to molded golf balls which contain particles of a high-molecular-weight polyolefin, preferably polyethylene, dispersed in the rubber as an impact modifier which increases the impact resistance of the golf balls and improves its cut resistance and click.

---

This invention relates to a molded golf ball in which any of the elastomeric vulcanizates employed in molded balls is used. The novelty consists in the use of a high-molecular-weight polyolefin as an impact modifier. It increases the impact resistance and the cut resistance of the ball, and gives it an improved click.

Figure 1:
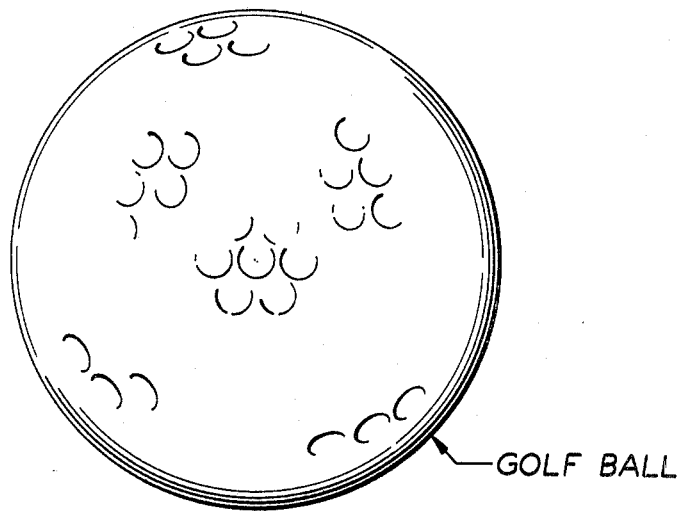
Figure 2:
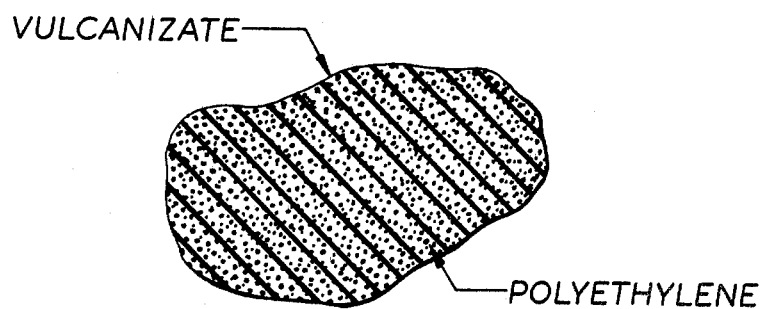

The invention is illustrated in the drawing, in which
FIGURE 1 illustrates a golf ball; and
FIGURE 2 illustrates the composition of the interior of the preferred ball in which particles of polyethylene are dispersed in the vulcanizate to serve as an impact modifier.

The rubbers employed in golf balls must have a high resilience. The vulcanizate may be derived from a stereo diene polymer of higher or lower cis content such as a polybutadiene or polyisoprene, or a mixture of the two. It may be an emulsion polymerized butadiene-acrylonitrile copolymer, with or without vinyl resin. Other rubbers that may be used include E.P.T. (ethylenepropylene diolefin terpolymer) and E.P.R. (ethylene propylene) rubbers, etc.

The impact modifier is a high-molecular-weight polyolefin such as polyethylene or polypropylene. It is of such a high molecular weight that it does not flux with the elastomer or elastomer vulcanizate, but is maintaind in the vulcanizate as a separate phase during and after cure. The polyethylene, for example, will ordinarily be a linear, particulate polyethylene having a molecular weight between 1,500,000 and 2,500,000, and preferably at least 90 percent of the particles will pass through a 100-mesh screen. The polyethylene known as 1221 Polyethylene which has a molecular weight of 1,500,000 to 2,500,000 has been found very satisfactory. These high molecular weight polyolefins, including polyethylenes and polypropylenes, when mixed with the elastomer do not melt and form a continuous phase with the elastomer but remain as a separate phase, and on heating to any normal curing temperature as, for example, a temperature up to 350° F. or 400° F., do not melt, although they may sinter, and they remain as a separate phase so that the final molded product is a two-phase solid system. The polyolefin is added as a powder and the particles of the powder remain distinct during the compounding on a mill or in a banbury.

The polyolefin is mixed with the elastomer in the unvulcanized state together with other compounding ingredients. The accelerator is preferably not sulfur. Antioxidant, zinc oxide, titanium dioxide or other coloring agent, a reinforcing agent which is preferably a silica will usually be compounded with the polymer.

The vulcanizing agents are usually of the peroxide type, and dicumyl peroxide has been found most satisfactory. Other peroxides used as polymerization catalysts may be employed as the vulcanizing or curing agent and also other free-radical-type vulcanizing agents as, for example: persulfates, azo compounds, hydrazines, amine oxides and the like, and ionizing radiation may be used. As disclosed in Canadian Patent 732,500, a co-agent may be used, particularly with dicumyl peroxide and other peroxides. Such co-agents include diacrylates and dimethacrylates as, for example, butylene glycol dimethacrylate, and surprisingly, other such esters which are tri-functional rather than bi-functional, including trialkylol alkane triacrylates and trimethacrylates including, for example, trimethylol propane trimethacrylate. Divinylbenzene may also be used as a co-agent with cumyl peroxide.

The usual antioxidants do not react with the high-molecular-weight polyolefins and may be employed as protection for the polymer during cure. They may also be used to make the polymer vulcanizate more resistant to heat and light aging. Any of the usual phenolics, diphenylamines, and reaction products thereof with aldehydes, phenyl-beta-naphthylamine, etc. may be used, the nonstaining antioxidants being preferred.

The reinforcing materials commonly employed may be utilized but for a golf ball, carbon black is not satisfactory because of its color, and silica compounds are preferred. It is usually desirable to add a coloring agent such as titanium dioxide.

The materials will be selected to produce a ball of suitable specific gravity which gives the distance and has the click, etc. required in a golf ball.

The following example is illustrative, in which the polybutadiene and polyisoprene employed both have a cis content of over 90 percent:

| | Phr. |
|---|---|
| Polybutadiene | 85 |
| Polyisoprene | 15 |
| Light calcined magnesium oxide | 5 |
| Trimethylol propane trimethacrylate | 25 |
| Dicumyl peroxide (40% active) | 7.5 |
| Polyethylene of 1,500,000 to 2,500,000 molecular weight | 35 |
| 2,2'-methylene-bis(6-t-butyl-4-methylphenol) | 0.5 |
| Titanium dioxide | 15 |
| Precipitated hydrated silica | 15 |

The aforesaid compounding ingredients were mixed with the elastomer in a conventional maner, introduced into a golf-ball mold, and then cured 30 minutes at 320° F. The amount of impact modifier will vary with different formulae.

Due to the presence of the impact modifier, the resulting ball has high cut resistance, high abrasion resistance, excellent rebound and a good click and good distance.

The invention is covered in the claims which follow.

I claim:
1. A molded ball having the gravity and click and rebound required in a golf ball and the size of a golf ball which includes elastomeric vulcanizate consisting of diolefin rubber or ethylene propylene rubber and, as an impact modifier, finely divided polyethylene dispersed in the vulcanizate, which polyethylene has a molecular weight of 1,500,000 to 2,500,000 and is present as a separate phase in the vulcanizate.

2. The golf ball of claim 1 in which the vulcanizate is composed of polybutadiene and polyisoprene each of which has a cis content of over 90 percent and the impact modifier is a linear, particulate polyethylene of which at least 90 percent will pass through a 100-mesh screen.

References Cited

UNITED STATES PATENTS

| | | | |
|---|---|---|---|
| 2,910,451 | 10/1959 | Cantwell | 260—889 |
| 2,927,904 | 3/1960 | Cooper | 260—889 |
| 3,238,156 | 3/1966 | Kohrn | 260—2.5 |
| 3,313,545 | 4/1967 | Bartsch | 260—41.5 |
| 3,373,123 | 3/1968 | Brice | 260—2.5 |
| 3,384,612 | 5/1968 | Brandt et al. | 260—41 |

FOREIGN PATENTS 829,148  2/1960  Great Britain.

MURRAY TILLMAN, Primary Examiner

M. J. TULLY, Assistant Examiner

U.S. Cl. X.R.

260—4, 41.5, 45.9, 45.95, 897; 273—218

Disclaimer 3,478,132.—*Clarence L. Randolph*, Ashland, Ohio. GOLF BALL COMPRISING AN ELASTOMER DISPERSION OF HIGH MOLECULAR WEIGHT POLYETHYLENE. Patent dated Nov. 11, 1969. Disclaimer filed July 30, 1973, by the assignee, *Eagle Rubber Co., Inc.*

Hereby enters this disclaimer to claims 1 and 2 of said patent.

[*Official Gazette September 11, 1973.*]